(12) United States Patent
Hsieh

(10) Patent No.: US 8,314,904 B2
(45) Date of Patent: Nov. 20, 2012

(54) PIXEL STRUCTURE OF REFLECTIVE DISPLAY

(75) Inventor: Cheng-Hsi Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 458 days.

(21) Appl. No.: 12/688,410

(22) Filed: Jan. 15, 2010

(65) Prior Publication Data

US 2010/0214515 A1 Aug. 26, 2010

(30) Foreign Application Priority Data

Feb. 24, 2009 (TW) ................... 98105854 A

(51) Int. Cl.
*G02F 1/1335* (2006.01)
(52) U.S. Cl. .......... 349/113; 349/106; 349/115
(58) Field of Classification Search .......... 349/106, 349/115
See application file for complete search history.

(56) References Cited

U.S. PATENT DOCUMENTS

| 4,886,343 A | | 12/1989 | Johnson |  |
|---|---|---|---|---|
| 5,267,060 A | * | 11/1993 | Colton | ................. 359/15 |
| 6,377,321 B1 | | 4/2002 | Khan et al. | |
| 6,741,321 B2 | | 5/2004 | Jeong et al. | |
| 6,812,980 B2 | * | 11/2004 | Karman | ................. 349/106 |
| 7,990,498 B2 | * | 8/2011 | Hong | ................. 349/106 |
| 2001/0030720 A1 | * | 10/2001 | Ichihashi | ................. 349/106 |
| 2007/0252933 A1 | | 11/2007 | Bayrle et al. | |
| 2010/0002183 A1 | * | 1/2010 | Fukuda | ................. 349/158 |
| 2012/0113367 A1 | * | 5/2012 | Kitson et al. | ................. 349/106 |

FOREIGN PATENT DOCUMENTS

TW    I233319    5/2005

* cited by examiner

*Primary Examiner* — Michelle R Connelly

(74) *Attorney, Agent, or Firm* — Morris Manning & Martin LLP; Tim Tingkang Xia, Esq.

(57) ABSTRACT

A pixel structure of a reflective display includes a first sub-pixel for reflecting a first color light, a second sub-pixel for reflecting a second color light, and a third sub-pixel for reflecting a third color light. The first color light, the second color light, and the third color light have different colors. The second sub-pixel and the third sub-pixel are aligned side by side and arranged on the same side of the first sub-pixel. A position of the first sub-pixel is corresponding to positions of the second sub-pixel and the third sub-pixel. A pixel area of the first sub-pixel is greater than that of the second sub-pixel, and is greater than that of the third sub-pixel.

23 Claims, 10 Drawing Sheets

… (1)

PIXEL STRUCTURE OF REFLECTIVE DISPLAY

CROSS-REFERENCE TO RELATED APPLICATIONS

This non-provisional application claims priority under 35 U.S.C. §119(a) on Patent Application No(s). 098105854 filed in Taiwan, R.O.C. on Feb. 24, 2009; , the entire contents of which are hereby incorporated by reference.

BACKGROUND

1. Field of the Invention

The present invention relates to a display, and more particularly to a reflective display.

2. Related Art

Various flat panel display devices have been developed to meet the increasingly high requirements for diversified display devices, for example, liquid crystal displays (LCDs), plasma display panels (PDPs), electro-luminescent displays (ELDs), and vacuum fluorescent displays (VFDs). Among the above flat panel display devices, the LCDs have replaced conventional cathode ray tubes (CRTs) to become the dominant products in the market due to the advantages of being light and thin, and having a low power consumption. The LCDs may be approximately categorized into reflective LCDs and transmissive LCDs. The reflective LCD utilizes external light as a light source, and does not need a backlight element, so the reflective LCD consumes less electric power than the transmissive LCD.

A cholesteric LCD is a reflective display using cholesteric liquid crystal to form a liquid crystal layer. The material of the cholesteric liquid crystal may be pure cholesteric liquid crystal, nematic liquid crystal added with a chiral dopant, or nematic liquid crystal added with cholesteric liquid crystal molecules. Generally, the material is mainly a mixed system of the nematic liquid crystal added with a chiral dopant. The mixed system has the advantage that the thermal, optical, and electrical features thereof can be easily modulated. Through a simple molecular design incorporated with a database, cholesteric liquid crystal materials having different reflection wavelengths, liquid crystal phase ranges, and photo-electric features can be obtained quickly depending upon different requirements.

The cholesteric liquid crystal has a bi-stable (memory) effect. Therefore, when no electric field is applied to drive the cholesteric liquid crystal, the displayed image can still remain for a long period of time, so as to save the electric power.

However, the brightness of the reflective display depends on an intensity of the external light source and the light utilization rate of the reflective display, so it is very important to improve the light utilization rate of the display. Furthermore, currently, in most reflective displays, a single pixel includes red (R), green (G), and blue (B) sub-pixels, and each sub-pixel has a different reflectance. Therefore, the effect of true color display is achieved by modulating the brightness of each sub-pixel.

SUMMARY

In an embodiment, the present invention is a pixel structure of a reflective display. The pixel structure comprises a first sub-pixel, a second sub-pixel, and a third sub-pixel.

The second sub-pixel and the third sub-pixel are aligned side by side and arranged on the same side of the first sub-pixel. A position of the first sub-pixel is corresponding to positions of the second sub-pixel and the third sub-pixel. A pixel area of the first sub-pixel is greater than that of the second sub-pixel, and is greater than that of the third sub-pixel.

The first sub-pixel reflects a first color light. The second sub-pixel reflects a second color light. Similarly, the third sub-pixel reflects a third color light. The first color light, the second color light, and the third color light have different colors.

In another embodiment, the present invention is a pixel structure of a reflective display. The pixel structure comprises a first liquid crystal layer and a second liquid crystal layer. The second liquid crystal layer is disposed on one side of the first liquid crystal layer.

The first liquid crystal layer comprises a first sub-pixel. The second liquid crystal layer comprises a second sub-pixel and a third sub-pixel. The second sub-pixel and the third sub-pixel are aligned side by side and arranged in the second liquid crystal layer.

A position of the first sub-pixel is corresponding to positions of the second sub-pixel and the third sub-pixel. A pixel area of the first sub-pixel is greater than that of the second sub-pixel, and is greater than that of the third sub-pixel.

The first sub-pixel reflects a first color light. The second sub-pixel reflects a second color light. Similarly, the third sub-pixel reflects a third color light. The first color light, the second color light, and the third color light have different colors.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Detailed features and advantages of the present invention are described in the embodiments below, and the contents are sufficient for those skilled in the art to understand the technical content of the present invention and to implement the present invention accordingly. According to the content disclosed in the specification, the claims, and the drawings, those skilled in the art can easily understand the objects and advantages of the present invention. The embodiments below further illustrate the ideas of the present invention in detail, but are not intended to limit the scope of the present invention within any idea.

In a pixel structure of a reflective display according to an embodiment of the present invention, a single pixel is designed into a dual-layer structure, and positions where sub-pixels are arranged in the dual-layer structure and sizes of the sub-pixels are configured according to luminous efficiencies of the sub-pixels with different colors, such that the sub-pixel having a lower efficiency achieves a higher aperture ratio. Thus, the light utilization rate of the display is improved, so as to improve the brightness of the color display.

Generally, a reflective display comprises a plurality of pixel structures arranged in a matrix. For the convenience of making descriptions, a single pixel structure is taken as an example below.

Figure 1:
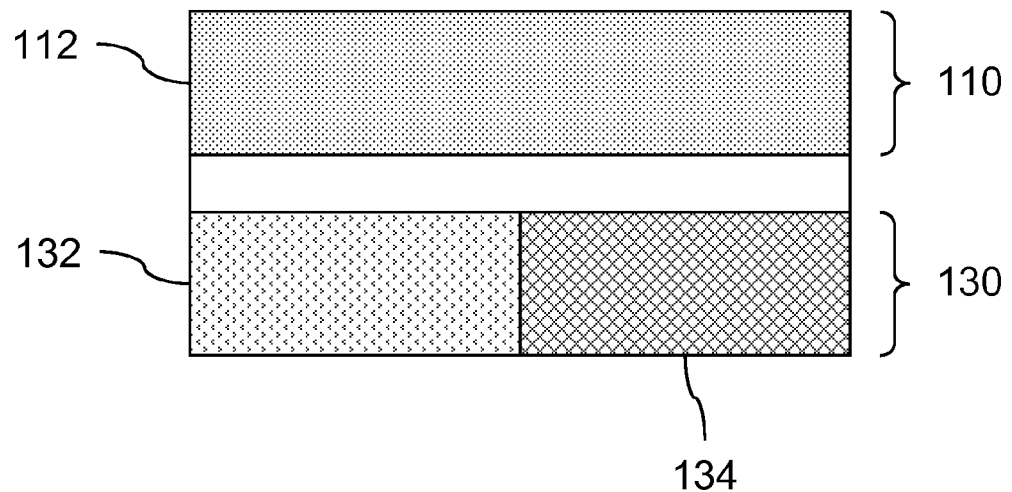
FIG. 1 is a schematic cross-sectional view of a pixel structure of a reflective display according to a first embodiment of the present invention.

Referring to FIG. 1, a pixel structure of a reflective display (i.e., a single pixel structure) comprises a first sub-pixel 112, a second sub-pixel 132, and a third sub-pixel 134.

The second sub-pixel 132 and the third sub-pixel 134 are aligned side by side and arranged on the same side of the first sub-pixel 112. That is, the second sub-pixel 132 and the third sub-pixel 134 are juxtaposed on the same side of the first sub-pixel 112. As shown in FIG. 1, the second sub-pixel 132 and the third sub-pixel 134 are disposed below the first sub-pixel 112.

A position of the first sub-pixel 112 is corresponding to positions of the second sub-pixel 132 and the third sub-pixel 134. A pixel area of the first sub-pixel 112 is greater than that of the second sub-pixel 132, and is greater than that of the third sub-pixel 134.

The pixel area of the first sub-pixel 112 may be greater than or equal to a sum of the pixel area of the second sub-pixel 132 and the pixel area of the third sub-pixel 134. In other words, a vertical projection of the first sub-pixel 112 covers the whole of the second sub-pixel 132 and the third sub-pixel 134. That is, both the second sub-pixel 132 and the third sub-pixel 134 are located within the vertical projection of the first sub-pixel 112.

The first sub-pixel 112 reflects a first color light. The second sub-pixel 132 reflects a second color light. Similarly, the third sub-pixel 134 reflects a third color light. The first color light, the second color light, and the third color light have different colors.

For example, in general, a single pixel structure at least has three primary colors, namely, red (R), blue (B), and green (G). Therefore, the first color light may be one of red light, blue light, and green light, the second color light may be one of red light, blue light, and green light, and the third color light may be one of red light, blue light, and green light. However, the colors of the first color light, the second color light, and the third color light are different from one another. That is, the first color light, the second color light, and the third color light may be red light, blue light, and green light respectively, or red light, green light, and blue light respectively, or blue light, red light, and green light respectively, or blue light, green light, and red light respectively, or green light, red light, and blue light respectively, or green light, blue light, and red light respectively.

The first sub-pixel 112 may be made of a first liquid crystal material, the second sub-pixel 132 may be made of a second liquid crystal material, and the third sub-pixel 134 may be made of a third liquid crystal material. The first liquid crystal material, the second liquid crystal material, and the third liquid crystal material reflect different color lights.

Taking the three primary colors for example, the first liquid crystal material may reflect one of the red light, the blue light, and the green light; the second liquid crystal material may reflect one of the red light, the blue light, and the green light; and the third liquid crystal material may reflect one of the red light, the blue light, and the green light; however, the lights reflected by the first, second, and third liquid crystal materials have different colors.

The first liquid crystal material may be a cholesteric liquid crystal. The second liquid crystal material may be a cholesteric liquid crystal. The third liquid crystal material may be a cholesteric liquid crystal.

The first liquid crystal material may comprise liquid crystals encapsulated by a plurality of micelles. The second liquid crystal material may comprise liquid crystals encapsulated by a plurality of micelles. The third liquid crystal material may comprise liquid crystals encapsulated by a plurality of micelles.

The first liquid crystal material may also be a plurality of liquid crystals in a common liquid state. The second liquid crystal material may also be a plurality of liquid crystals in a common liquid state. The third liquid crystal material may also be a plurality of liquid crystals in a common liquid state.

Figure 2:
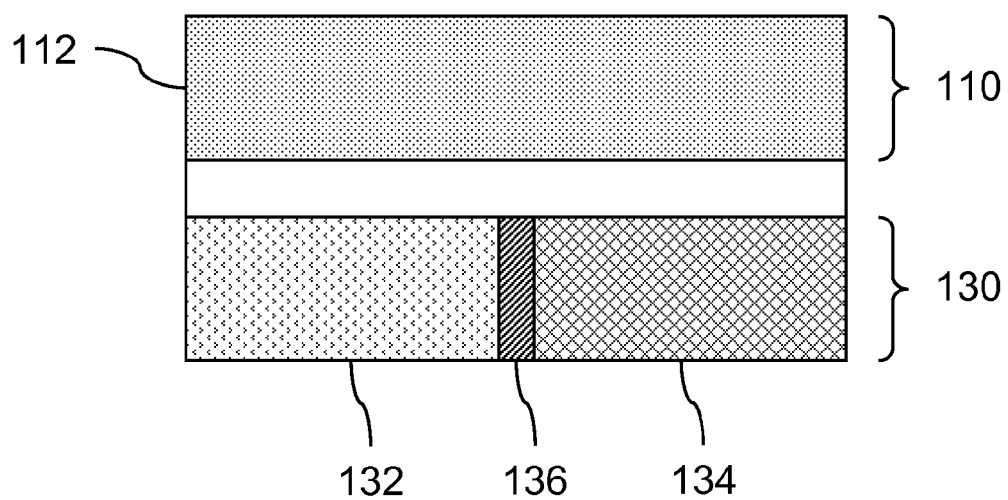
FIG. 2 is a schematic cross-sectional view of a pixel structure of a reflective display according to a second embodiment of the present invention.
Figure 3:
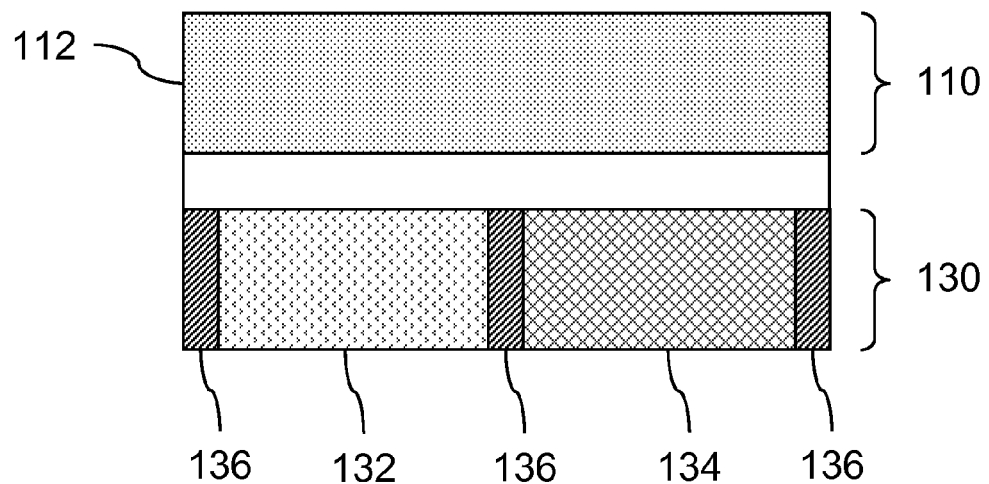
FIG. 3 is a schematic cross-sectional view of a pixel structure of a reflective display according to a third embodiment of the present invention.

The second sub-pixel 132 and the third sub-pixel 134 may be spaced apart from each other by a spacer 136, as shown in FIG. 2. The spacer 136 is used to space apart the second sub-pixel 132 and the third sub-pixel 134 in the same pixel structure. The spacer 136 is further used to space apart the second sub-pixel 132 and the third sub-pixel 134 in different pixel structures, as shown in FIG. 3. That is to say, the spacer 136 is disposed to ensure the positions for filling the liquid crystal materials. Therefore, the spacer 136 extends along a direction substantially perpendicular to the configuration direction of the second sub-pixel 132 and the third sub-pixel 134. The height of the spacer 136 is substantially the same as the thickness of the second sub-pixel 132, and is substantially the same as the thickness of the third sub-pixel 134. Moreover, the spacer 136 may also be used to space apart the first sub-pixels 112 in different pixel structures, so as to limit the position of the first liquid crystal material in each pixel structure (not shown).

In other words, the pixel structure of the reflective display (i.e., a single pixel structure) may comprise a first liquid crystal layer 110 and a second liquid crystal layer 130.

The first liquid crystal layer 110 comprises the first sub-pixel 112. The second liquid crystal layer 130 comprises the second sub-pixel 132 and the third sub-pixel 134.

The second liquid crystal layer 130 is disposed on one side of the first liquid crystal layer 110. As shown in FIG. 1, the second liquid crystal layer 130 is disposed below the first liquid crystal layer 110.

The second sub-pixel 132 and the third sub-pixel 134 are aligned side by side and arranged in the second liquid crystal layer 130. The position of the first sub-pixel 112 in the first liquid crystal layer 110 is corresponding to the positions of the second sub-pixel 132 and the third sub-pixel 134 in the second liquid crystal layer 130.

An absorption layer 150 may be disposed to absorb the light passing through the first liquid crystal layer 110 and the second liquid crystal layer 130, that is, the light passing through the first sub-pixel 112, the second sub-pixel 132, and the third sub-pixel 134. At this time, the external light is incident from one side of the pixel structure of the reflective display where the absorption layer 150 is not disposed, and the light reflected by the first sub-pixel 112, the second sub-pixel 132, and the third sub-pixel 134 is also emitted from the side of the pixel structure of the reflective display where the absorption layer 150 is not disposed.

Figure 4:
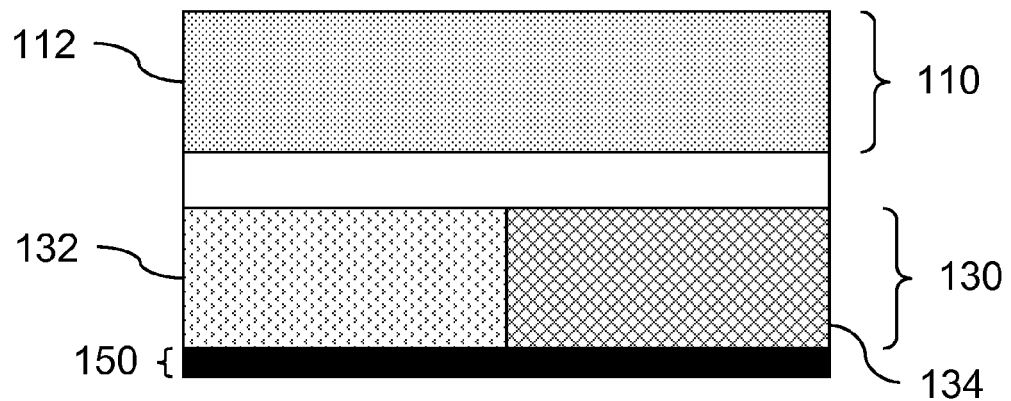
FIG. 4 is a schematic cross-sectional view of a pixel structure of a reflective display according to a fourth embodiment of the present invention.

Referring to FIG. 4, the absorption layer 150 may be disposed on one side of the second liquid crystal layer 130 opposite to the first liquid crystal layer 110. That is, the absorption layer 150 may be disposed on one side of the second sub-pixel 132 and the third sub-pixel 134 opposite to the first sub-pixel 112. As shown in FIG. 4, the absorption layer 150 is disposed below the second liquid crystal layer 130.

At this time, the external light is incident from a position above the first liquid crystal layer 110, that is, from one side of the first liquid crystal layer 110 opposite to the second liquid crystal layer 130.

When the external light is incident on the first sub-pixel 112 in the first liquid crystal layer 110, the first sub-pixel 112 reflects the first color light in the incident light, and the remaining light passes through the first sub-pixel 112 and is incident on the second liquid crystal layer 130. In other words, the first sub-pixel 112 has a first surface and a second surface opposite to each other. In addition, the second surface of the first sub-pixel 112 is configured on one side close to the second liquid crystal layer 130, and the first surface of the first sub-pixel 112 is configured on the other side opposite to the second liquid crystal layer 130. After the external light is incident from the first surface of the first sub-pixel 112, the first sub-pixel 112 reflects the first color light in the incident light, such that the first color light is emitted from the first surface of the first sub-pixel 112. The remaining light passes through the first sub-pixel 112, leaves the first sub-pixel 112 from the second surface of the first sub-pixel 112, and is incident on the second liquid crystal layer 130.

As the second sub-pixel 132 and the third sub-pixel 134 are aligned side by side in the second liquid crystal layer 130, the light passing through the first sub-pixel 112 (that is, the light passing through the first liquid crystal layer 110) is respectively incident on the second sub-pixel 132 and the third sub-pixel 134 in the second liquid crystal layer 130.

When the light passing through the first sub-pixel 112 is incident on the second sub-pixel 132 in the second liquid crystal layer 130, the second sub-pixel 132 reflects the second color light in the incident light, and the remaining light passes through the second sub-pixel 132 and is incident on the absorption layer 150. In other words, the second sub-pixel 132 has a first surface and a second surface opposite to each other. In addition, the first surface of the second sub-pixel 132 is configured on one side close to the first liquid crystal layer 110, and the second surface of the second sub-pixel 132 is configured on the other side opposite to the first liquid crystal layer 110. After the light passing through the first sub-pixel 112 is incident from the first surface of the second sub-pixel 132, the second sub-pixel 132 reflects the second color light in the incident light, such that the second color light is emitted from the first surface of the second sub-pixel 132 and passes through the first sub-pixel 112, so as to display the color of the pixel of the reflective display. The remaining light passes through the second sub-pixel 132, leaves the second sub-pixel 132 from the second surface thereof, and is incident on the absorption layer 150.

When the light passing through the first sub-pixel 112 is incident on the third sub-pixel 134 in the second liquid crystal layer 130, the third sub-pixel 134 reflects the third color light in the incident light, and the remaining light passes through the third sub-pixel 134 and is incident on the absorption layer 150. In other words, the third sub-pixel 134 has a first surface and a second surface opposite to each other. In addition, the first surface of the third sub-pixel 134 is configured on one side close to the first liquid crystal layer 110, and the second surface of the third sub-pixel 134 is configured on the other side opposite to the first liquid crystal layer 110. After the light passing through the first sub-pixel 112 is incident from the first surface of the third sub-pixel 134, the third sub-pixel 134 reflects the third color light in the incident light, such that the third color light is emitted from the first surface of the third sub-pixel 134 and passes through the first sub-pixel 112, so as to display the color of the pixel of the reflective display. The remaining light passes through the third sub-pixel 134, leaves the third sub-pixel 134 from the second surface thereof, and is incident on the absorption layer 150.

The absorption layer 150 absorbs the incident light passing through the second sub-pixel 132 and the third sub-pixel 134.

Figure 5:
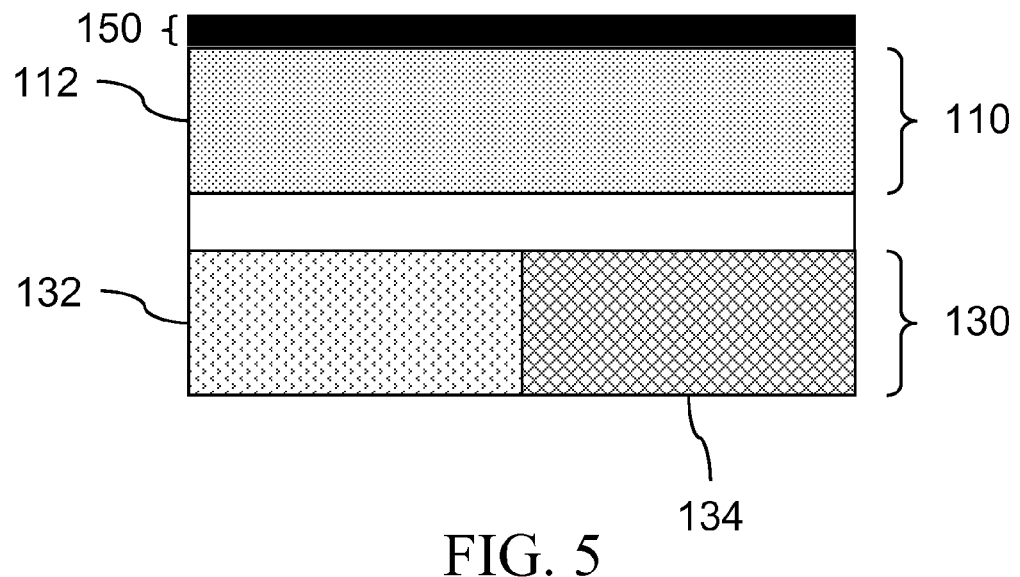
FIG. 5 is a schematic cross-sectional view of a pixel structure of a reflective display according to a fifth embodiment of the present invention.

Referring to FIG. 5, the absorption layer 150 may also be disposed on one side of the first liquid crystal layer 110 opposite to the second liquid crystal layer 130. That is, the absorption layer 150 may be disposed on one side of the first sub-pixel 112 opposite to the second sub-pixel 132 and the third sub-pixel 134. As shown in FIG. 5, the absorption layer 150 is disposed above the first liquid crystal layer 110.

In this case, the external light is incident from a position below the second liquid crystal layer 130, that is, from one side of the second liquid crystal layer 130 opposite to the first liquid crystal layer 110.

As the second sub-pixel 132 and the third sub-pixel 134 are aligned side by side in the second liquid crystal layer 130, the external light is respectively incident on the second sub-pixel 132 and the third sub-pixel 134 in the second liquid crystal layer 130.

When the external light is incident on the second sub-pixel 132 in the second liquid crystal layer 130, the second sub-pixel 132 reflects the second color light in the incident light, and the remaining light passes through the second sub-pixel 132 and is incident on the first liquid crystal layer 110. In other words, the second sub-pixel 132 has a first surface and a second surface opposite to each other. In addition, the first surface of the second sub-pixel 132 is configured on one side close to the first liquid crystal layer 110, and the second surface of the second sub-pixel 132 is configured on the other side opposite to the first liquid crystal layer 110. After the external light is incident from the second surface of the second sub-pixel 132, the second sub-pixel 132 reflects the second color light in the incident light, such that the second color light is emitted from the second surface of the second sub-pixel 132. The remaining light passes through the second sub-pixel 132, leaves the second sub-pixel 132 from the first surface thereof, and is incident on the first liquid crystal layer 110.

When the external light is incident on the third sub-pixel 134 in the second liquid crystal layer 130, the third sub-pixel 134 reflects the third color light in the incident light, and the remaining light passes through the third sub-pixel 134 and is incident on the first liquid crystal layer 110. In other words, the third sub-pixel 134 has a first surface and a second surface opposite to each other. In addition, the first surface of the third sub-pixel 134 is configured on one side close to the first liquid crystal layer 110, and the second surface of the third sub-pixel 134 is configured on the other side opposite to the first liquid crystal layer 110. After the external light is incident from the second surface of the third sub-pixel 134, the third sub-pixel 134 reflects the third color light in the incident light, such that the third color light is emitted from the second surface of the third sub-pixel 134. The remaining light passes through the third sub-pixel 134, leaves the third sub-pixel 134 from the first surface thereof, and is incident on the first liquid crystal layer 110.

When the light passing through the second liquid crystal layer 130 (that is, the light passing through the second sub-pixel 132 and the third sub-pixel 134) is incident on the first sub-pixel 112 in the first liquid crystal layer 110, the first sub-pixel 112 reflects the first color light in the incident light, and the remaining light passes through the first sub-pixel 112 and is incident on the absorption layer 150. In other words, the first sub-pixel 112 has a first surface and a second surface opposite to each other. In addition, the first surface of the third sub-pixel 112 is configured on one side close to the absorption layer 150, and the second surface of the third sub-pixel 112 is configured on the other side opposite to the absorption layer 150. After the light passing through the second sub-pixel 132 and the third sub-pixel 134 is incident from the second surface of the first sub-pixel 112, the first sub-pixel 112 reflects the first color light in the incident light, such that the first color light is emitted from the second surface of the first sub-pixel 112, and passes through the second liquid crystal layer 130 (that is, passing through the second sub-pixel 132 or the third sub-pixel 134), so as to display the color of the pixel of the reflective display. The remaining light passes through the first sub-pixel 112, leaves the first sub-pixel 112 from the first surface thereof, and is incident on the absorption layer 150.

The absorption layer 150 absorbs the incident light passing through the first sub-pixel 112.

Furthermore, in the above descriptions, the sub-pixels (i.e., the first sub-pixel 112, the second sub-pixel 132, and the third sub-pixel 134) reflect the corresponding color lights (that is, the first color light, the second color light, and the third color light), and allow the light in the other colors to pass there through. However, the above descriptions do not exclude the circumstance that a part of the light is absorbed due to the essence of the materials of the sub-pixels.

The absorption layer 150 may have a color. Preferably, the absorption layer 150 is black. Here, the absorption layer 150 may be formed with a dye layer using a black dye.

Furthermore, substrates may be used to support the layers. For the convenience of making descriptions, the numbers of first, second, third, and fourth are used to distinguish different substrates. Here, the first, second, third, and fourth do not indicate any specific sequence.

Figure 6:
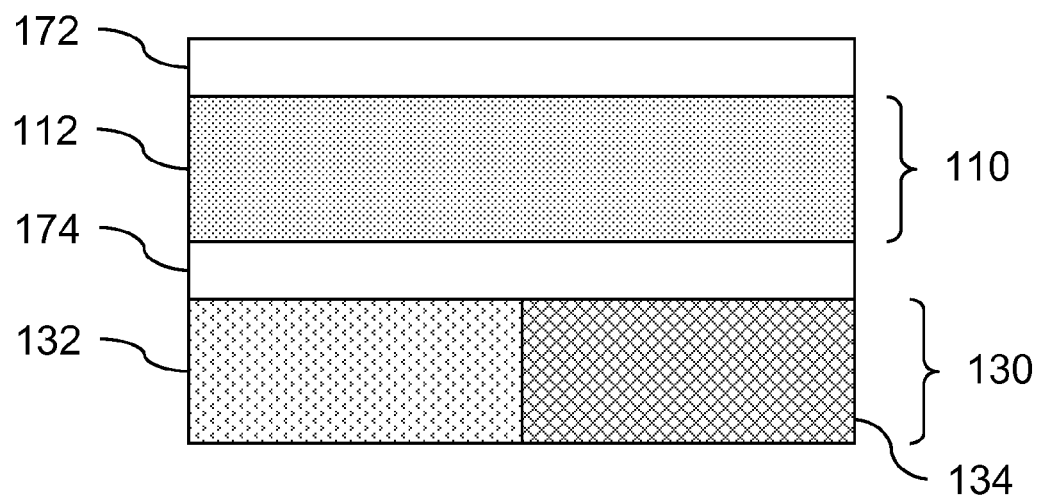
FIG. 6 is a schematic cross-sectional view of a pixel structure of a reflective display according to a sixth embodiment of the present invention.

Referring to FIG. 6, the first sub-pixel 112 is sandwiched between a first substrate 172 and a second substrate 174, that is, the first liquid crystal layer 110 is sandwiched between the first substrate 172 and the second substrate 174. In other words, the first substrate 172 and the second substrate 174 are arranged opposite to each other. Moreover, the first substrate 172 and the second substrate 174 are respectively disposed on two opposite sides of the first sub-pixel 112. That is, the first substrate 172 and the second substrate 174 are respectively disposed on two opposite sides of the first liquid crystal layer 110.

The first substrate 172 is disposed above the first liquid crystal layer 110, and the second substrate 174 is disposed between the first liquid crystal layer 110 and the second liquid crystal layer 130.

Figure 7:
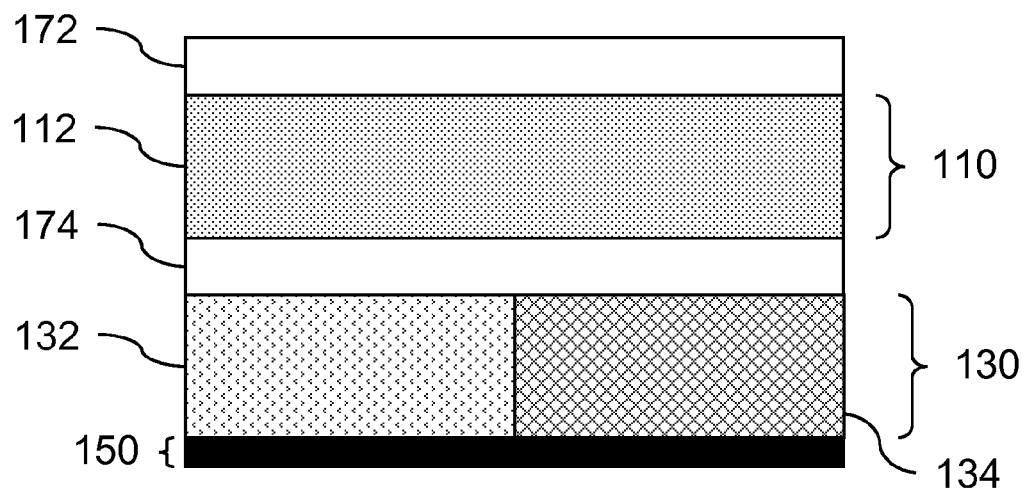
FIG. 7 is a schematic cross-sectional view of a pixel structure of a reflective display according to a seventh embodiment of the present invention.

The absorption layer 150 may be disposed on one side of the second liquid crystal layer 130 (i.e., the second sub-pixel 132 and the third sub-pixel 134) opposite to the first liquid crystal layer 110 (i.e., the first sub-pixel 112). That is, the second sub-pixel 132 and the third sub-pixel 134 are sandwiched between the absorption layer 150 and the second substrate 174, as shown in FIG. 7. The absorption layer 150 is disposed below the second liquid crystal layer 130. In other words, the absorption layer 150, the second liquid crystal layer 130, the second substrate 174, the first liquid crystal layer 110, and the first substrate 172 are stacked sequentially.

Figure 8:
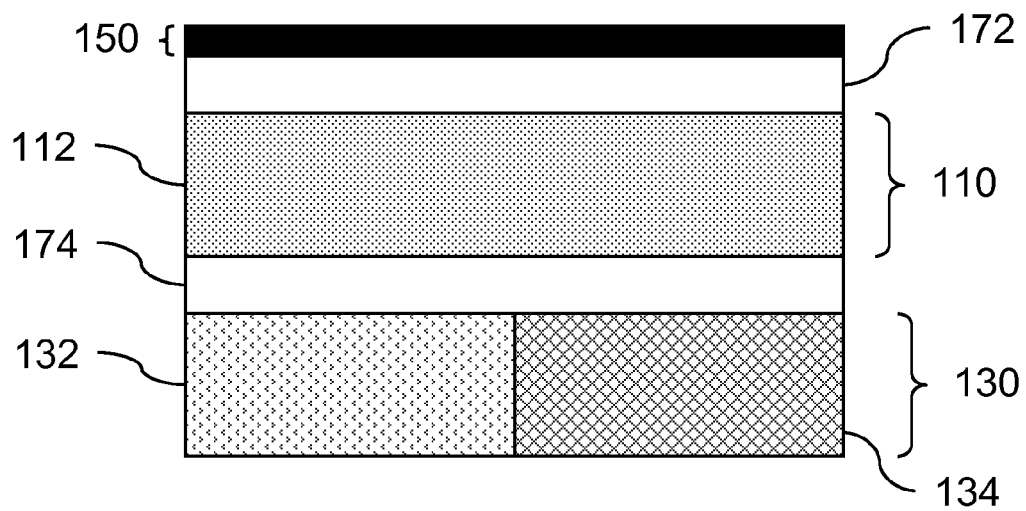
FIG. 8 is a schematic cross-sectional view of a pixel structure of a reflective display according to an eighth embodiment of the present invention.

In addition, the absorption layer 150 may be disposed on one side of the first substrate 172 opposite to the first liquid crystal layer 110, that is, disposed on the outermost side of the pixel structure of the reflective display, as shown in FIG. 8. Here, the absorption layer 150 is disposed above the first substrate 172. In other words, the second liquid crystal layer 130, the second substrate 174, the first liquid crystal layer 110, the first substrate 172, and the absorption layer 150 are stacked sequentially.

Figure 9:
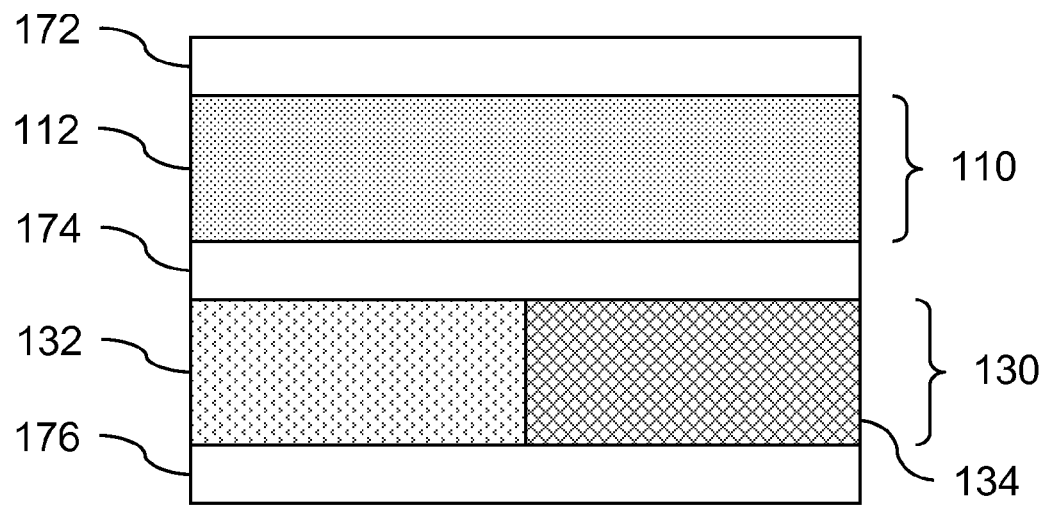
FIG. 9 is a schematic cross-sectional view of a pixel structure of a reflective display according to a ninth embodiment of the present invention.

In addition, a third substrate 176 may be further arranged, as shown in FIG. 9. The third substrate 176 and the second substrate 174 are disposed opposite to each other. Moreover, the second liquid crystal layer 130 (i.e., the second sub-pixel 132 and the third sub-pixel 134) may be sandwiched between the second substrate 172 and the third substrate 176, as shown in FIG. 9. In other words, the first liquid crystal layer 110 and the second liquid crystal layer 130 share the second substrate 172. Here, the third substrate 176 is disposed below the second liquid crystal layer 130, that is, disposed on one side of the second liquid crystal layer 130 opposite to the second substrate 172.

Figure 10:
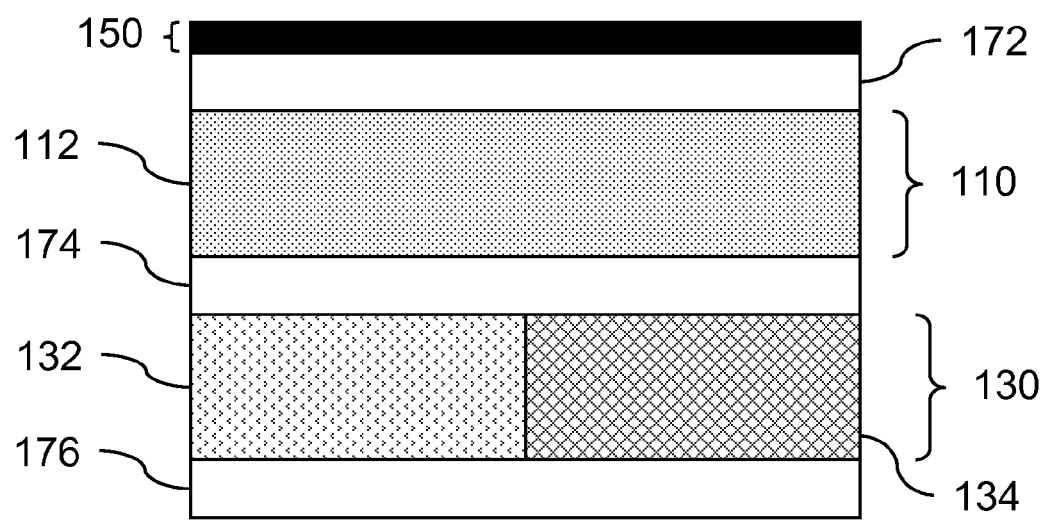
FIG. 10 is a schematic cross-sectional view of a pixel structure of a reflective display according to a tenth embodiment of the present invention.

The absorption layer 150 may be disposed on one side of the first substrate 172 opposite to the first liquid crystal layer 110, that is, disposed on one side of the first substrate 172 opposite to the first sub-pixel 112, as shown in FIG. 10. The absorption layer 150 is disposed above the first substrate 172. In other words, the third substrate 176, the second liquid crystal layer 130, the second substrate 174, the first liquid crystal layer 110, the first substrate 172, and the absorption layer 150 are stacked sequentially.

Figure 11:
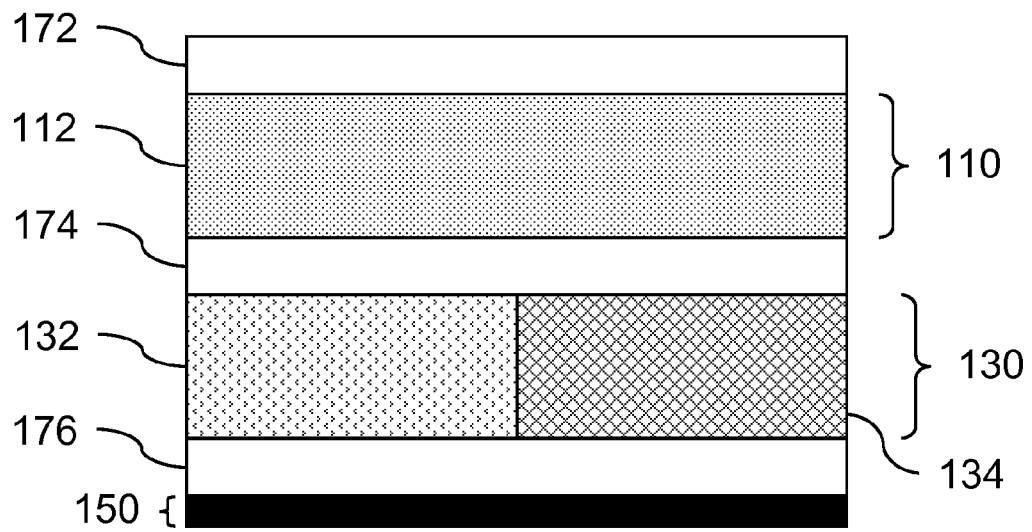
FIG. 11 is a schematic cross-sectional view of a pixel structure of a reflective display according to an eleventh embodiment of the present invention.

In addition, the absorption layer 150 may be disposed on one side of the third substrate 176 opposite to the second liquid crystal layer 130, that is, disposed on one side of the third substrate 176 opposite to the second sub-pixel 132 and the third sub-pixel 134, as shown in FIG. 11. The absorption layer 150 is disposed below the third substrate 176. In other words, the absorption layer 150, the third substrate 176, the second liquid crystal layer 130, the second substrate 174, the first liquid crystal layer 110, and the first substrate 172 are stacked sequentially.

Furthermore, merely the second liquid crystal layer 130 is sandwiched between two substrates.

Figure 12:
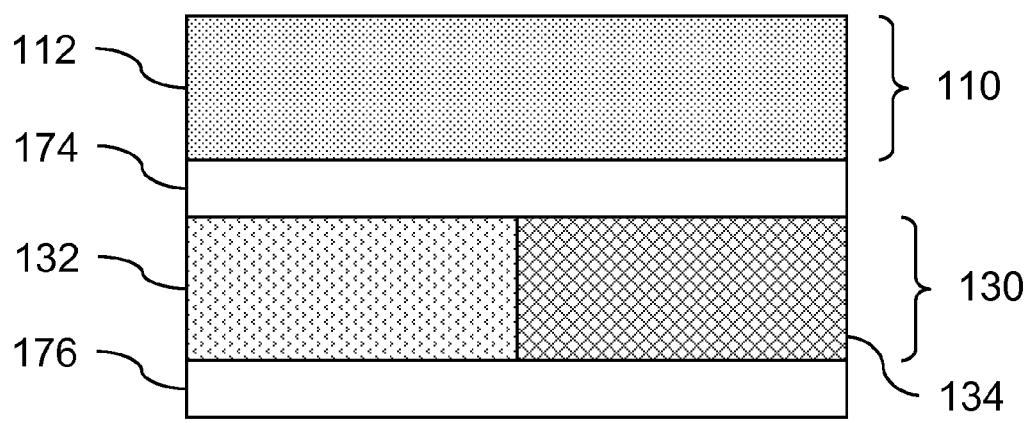
FIG. 12 is a schematic cross-sectional view of a pixel structure of a reflective display according to a twelfth embodiment of the present invention.

Referring to FIG. 12, the second liquid crystal layer 130 (i.e., the second sub-pixel 132 and the third sub-pixel 134) is sandwiched between the second substrate 172 and the third substrate 176.

Figure 13:
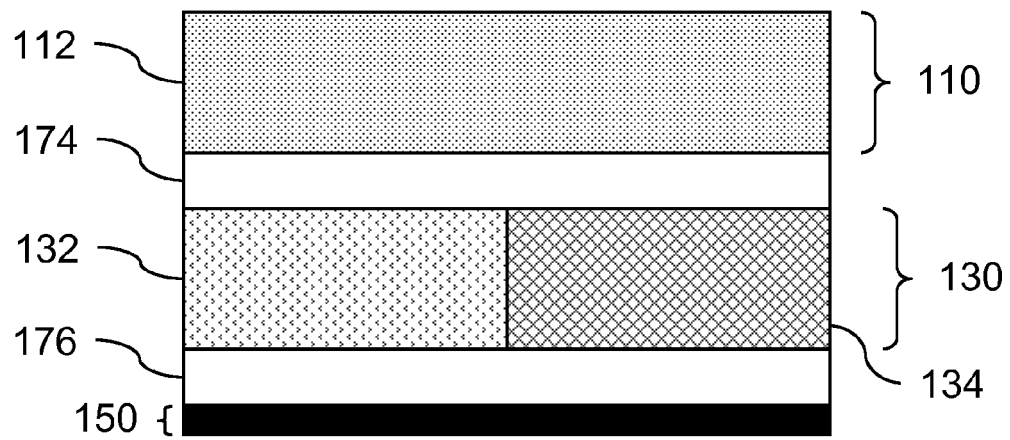
FIG. 13 is a schematic cross-sectional view of a pixel structure of a reflective display according to a thirteenth embodiment of the present invention.

The absorption layer 150 may be disposed on one side of the third substrate 176 opposite to the second liquid crystal layer 130, that is, disposed on one side of the third substrate 176 opposite to the second sub-pixel 132 and the third sub-pixel 134, as shown in FIG. 13. Here, the absorption layer 150 is disposed below the third substrate 176. In other words, the absorption layer 150, the third substrate 176, the second liquid crystal layer 130, the second substrate 174, and the first liquid crystal layer 110 are stacked sequentially.

Figure 14:
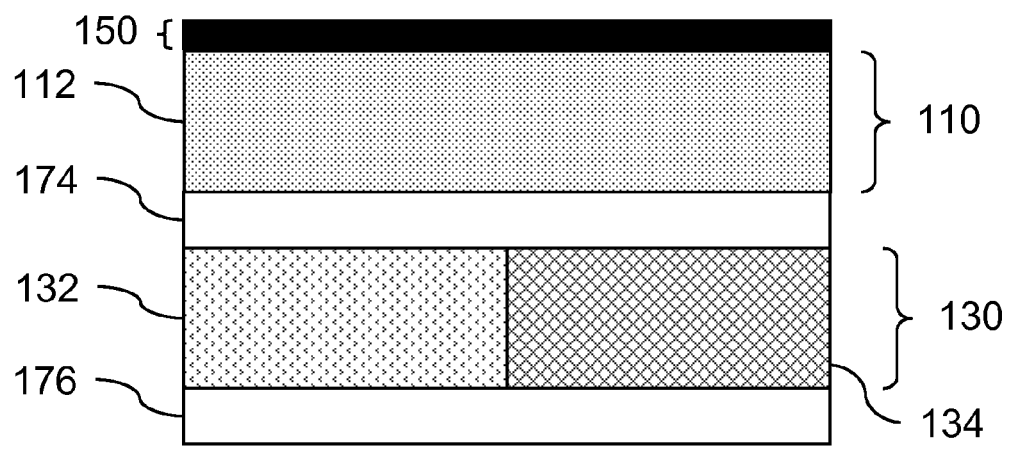
FIG. 14 is a schematic cross-sectional view of a pixel structure of a reflective display according to a fourteenth embodiment of the present invention.

In addition, the absorption layer 150 may be disposed on one side of the first liquid crystal layer 110 (i.e., the first sub-pixel 112) opposite to the second substrate 174 (i.e., the second sub-pixel 132 and the third sub-pixel 134), that is, the first sub-pixel 112 is sandwiched between the absorption layer 150 and the second substrate 174, as shown in FIG. 14. The absorption layer 150 is disposed above the first liquid crystal layer 110. In other words, the third substrate 176, the second liquid crystal layer 130, the second substrate 174, the first liquid crystal layer 110, and the absorption layer 150 are stacked sequentially.

Figure 15:
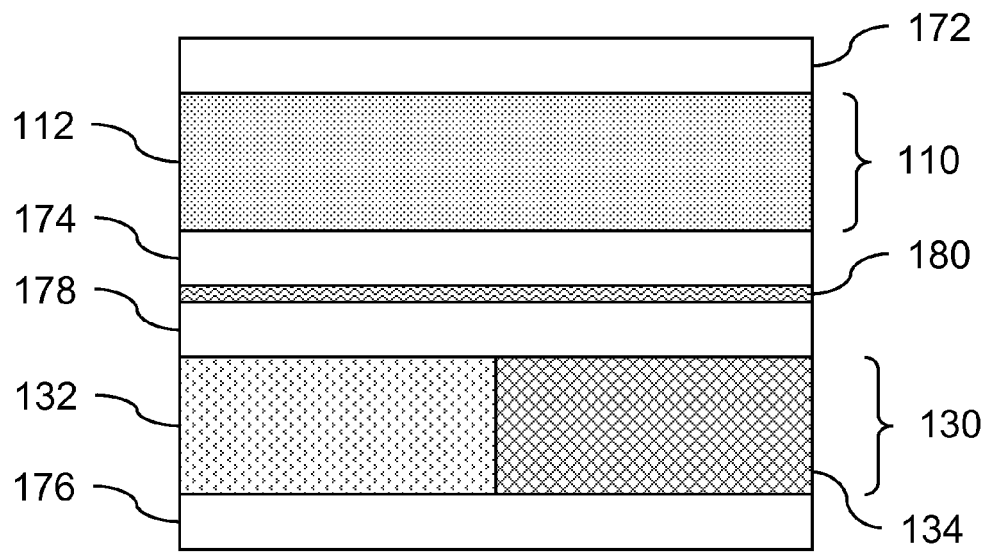
FIG. 15 is a schematic cross-sectional view of a pixel structure of a reflective display according to a fifteenth embodiment of the present invention.

However, each of the first liquid crystal layer 110 and the second liquid crystal layer 130 may have two corresponding substrates, and may be sandwiched between the two corresponding substrates respectively. Referring to FIG. 15, the first substrate 172 and the second substrate 174 are arranged opposite to each other, and the third substrate 176 and the fourth substrate 178 are arranged opposite to each other. Furthermore, the second substrate 174 and the fourth substrate 178 are disposed between the first liquid crystal layer 110 (i.e., the first sub-pixel 112) and the second liquid crystal layer 130 (i.e., the second sub-pixel 132 and the fourth sub-pixel 134).

The first liquid crystal layer 110 is sandwiched between the first substrate 172 and the second substrate 174. The second liquid crystal layer 130 is sandwiched between the third substrate 176 and the fourth substrate 178.

Figure 16:
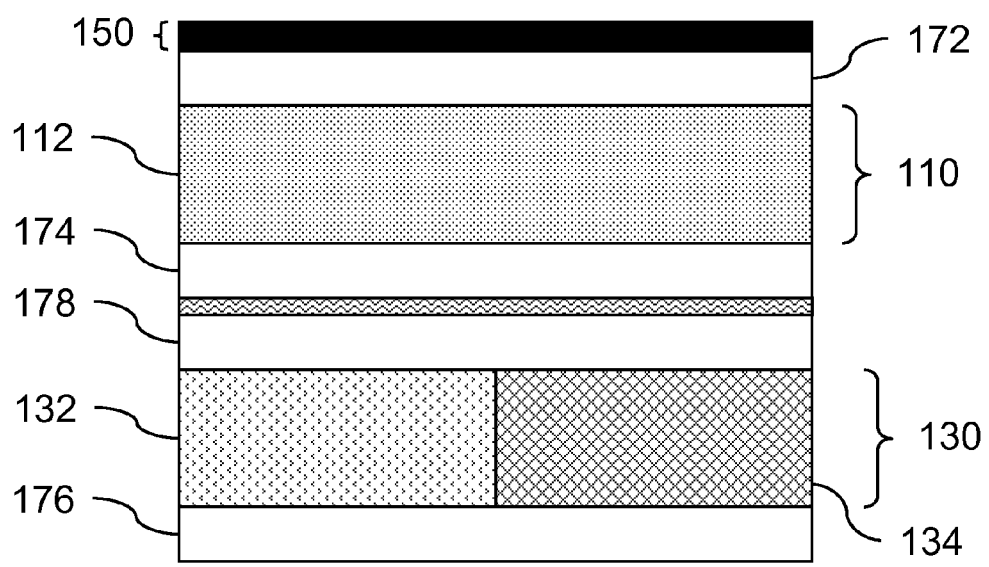
FIG. 16 is a schematic cross-sectional view of a pixel structure of a reflective display according to a sixteenth embodiment of the present invention.
Figure 17:
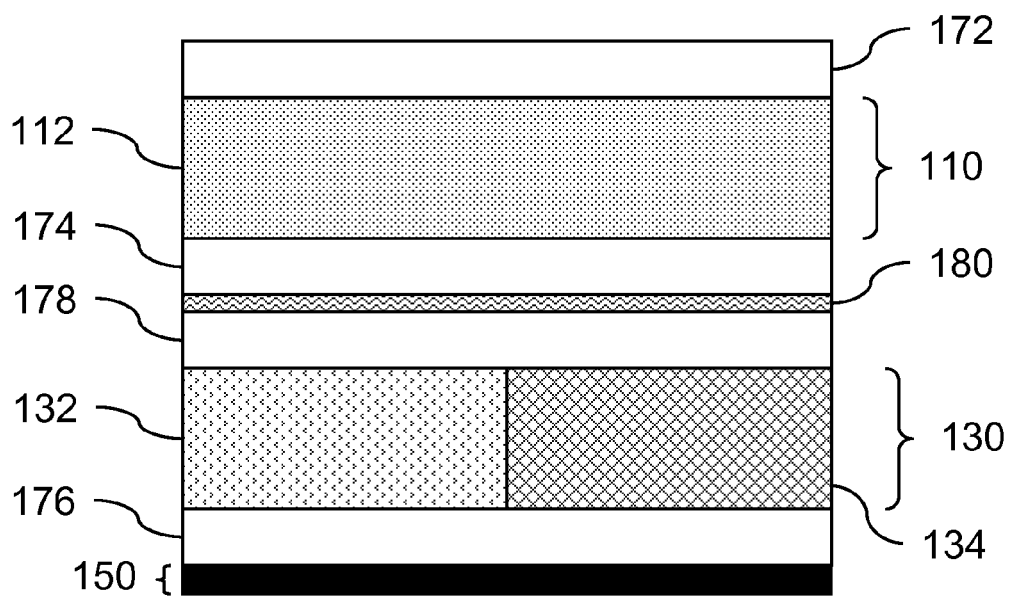
FIG. 17 is a schematic cross-sectional view of a pixel structure of a reflective display according to a seventeenth embodiment of the present invention.

The absorption layer 150 may be disposed on one side of the first substrate 172 or the third substrate 176 opposite to the liquid crystal layer, as shown in FIGS. 16 and 17.

Referring to FIG. 16, the absorption layer 150 is disposed on one side of the first substrate 172 opposite to the first liquid crystal layer 110, that is, disposed on one side of the first substrate 172 opposite to the first sub-pixel 112. The absorption layer 150 is disposed above the first substrate 172. In other words, the third substrate 176, the second liquid crystal layer 130, the fourth substrate 178, the second substrate 174, the first liquid crystal layer 110, the first substrate 172, and the absorption layer 150 are stacked sequentially.

Referring to FIG. 17, the absorption layer 150 is disposed on one side of the third substrate 176 opposite to the second liquid crystal layer 130, that is, disposed on one side of the third substrate 176 opposite to the second sub-pixel 132 and the third sub-pixel 134. Here, the absorption layer 150 is disposed below the third substrate 176. In other words, the absorption layer 150, the third substrate 176, the second liquid crystal layer 130, the fourth substrate 178, the second substrate 174, and the first liquid crystal layer 110 are stacked sequentially.

The second substrate 174 and the fourth substrate 178 may be adhered together by using an adhering layer 180 disposed there-between, as shown in FIG. 15.

The first substrate 172 may be a transparent substrate. The second substrate 174 may be a transparent substrate. The third substrate 176 may be a transparent substrate. The fourth substrate 178 may be a transparent substrate.

Each of the sub-pixels (for example, the first sub-pixel 112, the second sub-pixel 132, or the third sub-pixel 134) may be driven by a driving voltage provided by two electrodes.

Figure 18:
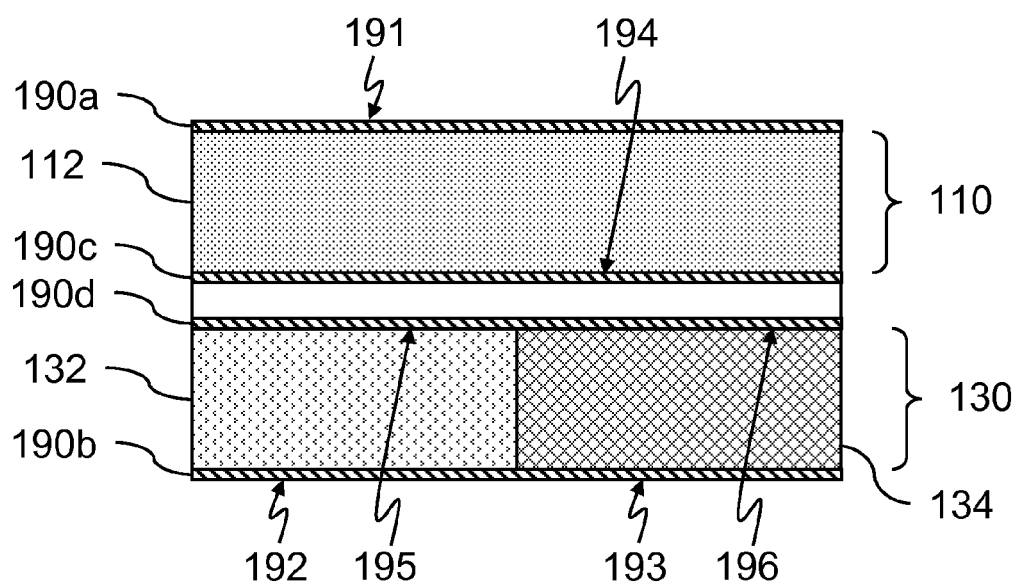
FIG. 18 is a schematic cross-sectional view of a pixel structure of a reflective display according to an eighteenth embodiment of the present invention.

Referring to FIG. 18, a first electrode layer 190a and a third electrode layer 190c are respectively formed on two sides of the first liquid crystal layer 110 (i.e., the first sub-pixel 112), and a second electrode layer 190b and a fourth electrode layer 190d are respectively formed on two sides of the second liquid crystal layer 130 (i.e., the second sub-pixel 132 and the third sub-pixel 134). The third electrode layer 190c and the fourth electrode layer 190d are disposed between the first liquid crystal layer 110 and the second liquid crystal layer 130, the third electrode layer 190c is adjacent to the first liquid crystal layer 110, and the fourth electrode layer 190d is adjacent to the second liquid crystal layer 130.

The first electrode layer 190a has a patterned first electrode 191. The third electrode layer 190c has a patterned fourth electrode 194. The first electrode 191 and the fourth electrode 194 are corresponding to the first sub-pixel 112, and are respectively disposed on two opposite sides of the first sub-pixel 112. The first electrode 191 and the fourth electrode 194 provide a driving voltage to the first sub-pixel 112.

The second electrode layer 190b has a patterned second electrode 192 and a patterned third electrode 193. The fourth electrode layer 190d has a patterned fifth electrode 195 and a patterned sixth electrode 196.

The second electrode 192 and the fifth electrode 195 are corresponding to the second sub-pixel 132, and are respectively disposed on two opposite sides of the second sub-pixel 132. The second electrode 192 and the fifth electrode 195 provide a driving voltage to the second sub-pixel 132.

The third electrode 193 and the sixth electrode 196 are corresponding to the third sub-pixel 134, and are respectively disposed on two opposite sides of the third sub-pixel 134. The third electrode 193 and the sixth electrode 196 provide a driving voltage to the third sub-pixel 134.

In addition, the fifth electrode and the sixth electrode may be equipotential.

Figure 19:
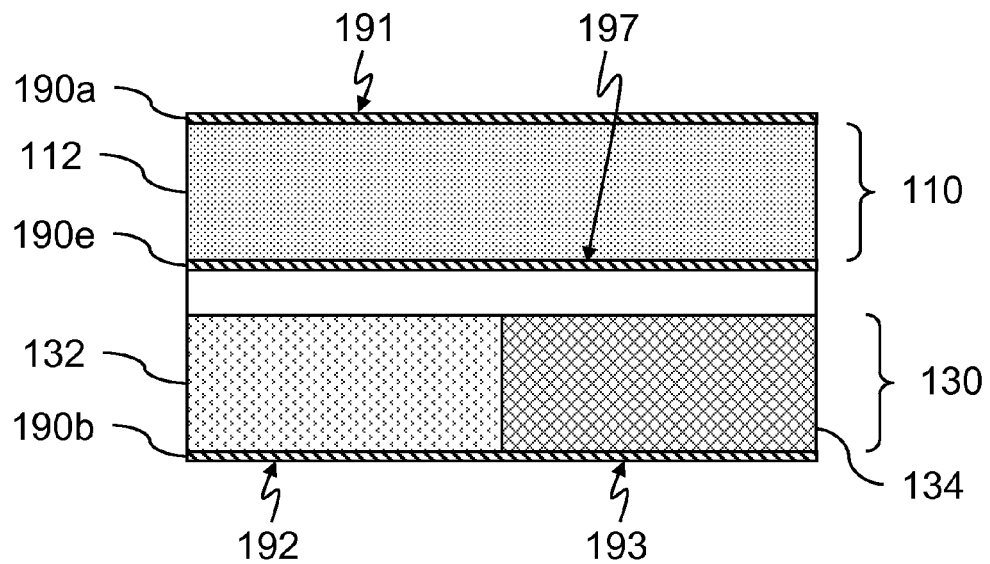
FIG. 19 is a schematic cross-sectional view of a pixel structure of a reflective display according to a nineteenth embodiment of the present invention.
Figure 20:
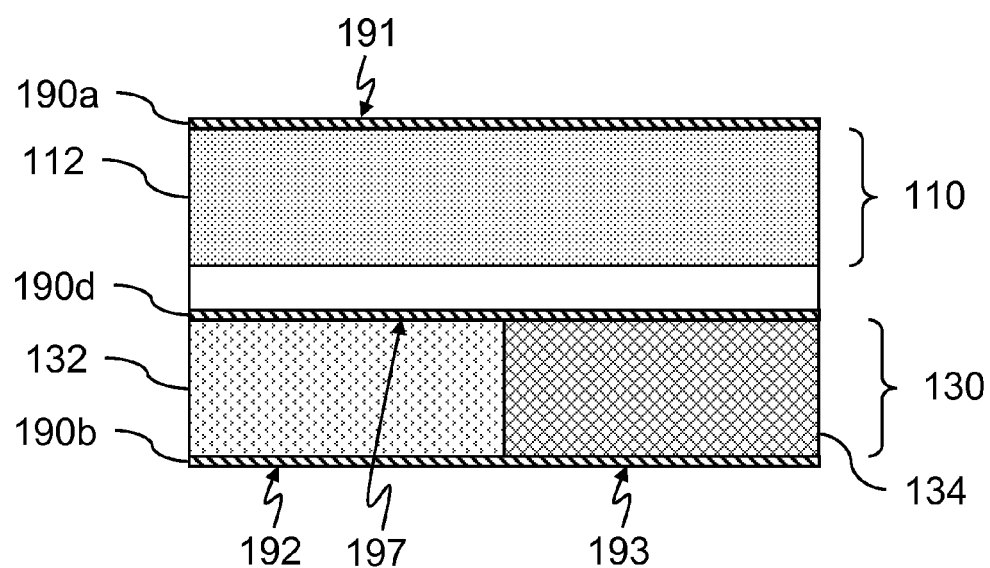
FIG. 20 is a schematic cross-sectional view of a pixel structure of a reflective display according to a twentieth embodiment of the present invention.

Here, the third electrode layer 190c and the fourth electrode layer 190d may be replaced by a common electrode layer 190e, as shown in FIGS. 19 and 20. The common electrode layer 190e is disposed between the first liquid crystal layer 110 and the second liquid crystal layer 130.

The common electrode layer 190e has a patterned common electrode 197. In other words, the fourth electrode 194, the fifth electrode 195, and the sixth electrode 196 may be replaced by the common electrode 197.

The common electrode 197 and the first electrode 191 are disposed on two opposite sides of the first sub-pixel 112. The common electrode 197 and the second electrode 192 are disposed on two opposite sides of the second sub-pixel 132. The common electrode 197 and the third electrode 193 are disposed on two opposite sides of the third sub-pixel 134.

The first electrode 191 and the common electrode 197 provide a driving voltage to the first sub-pixel 112. The second electrode 192 and the common electrode 197 provide a driving voltage to the second sub-pixel 132. The third electrode 193 and the common electrode 197 provide a driving voltage to the third sub-pixel 134.

The electrode layer (for example, the first electrode layer 190a, the second electrode layer 190b, the third electrode layer 190c, the fourth electrode layer 190d, or the common electrode layer 190e) may be formed on the surface of the substrate (for example, the first substrate 172, the second electrode 174, the third electrode 176, or the fourth electrode 178) or the absorption layer 150. Moreover, the first electrode layer 190a and the second electrode layer 190b may be formed on the outermost layer (i.e., the highest or lowest layer) of the pixel structure of the reflective display, so as to serve as external electrodes.

In addition, the first electrode layer 190a may be made of a transparent conductive material, for example, indium tin oxide (ITO). The second electrode layer 190b may be made of a transparent conductive material, for example, ITO. The third electrode layer 190c may be made of a transparent conductive material, for example, ITO. The fourth electrode layer 190d may be made of a transparent conductive material, for example, ITO. The common electrode layer 190e may be made of a transparent conductive material, for example, ITO.

The color of the light corresponding to each of the sub-pixels is determined depending on the reflectance of the sub-pixel itself and the light absorption rates of various layers on the optical path (for example, the first liquid crystal layer 110, the second liquid crystal layer 130, the first substrate 172, the second substrate 174, the third substrate 176, the fourth substrate 178, the adhering layer 180, the first electrode layer 190a, the second electrode layer 190b, the third electrode layer 190c, the fourth electrode layer 190d, or the common electrode layer 190e).

In a pixel structure of a reflective display according to an embodiment of the present invention, a single pixel is designed into a dual-layer structure, and positions where sub-pixels are arranged in the dual-layer structure and sizes of the sub-pixels are configured according to luminous efficiencies of the sub-pixels with different colors, such that the sub-pixel (i.e., the first sub-pixel) having a lower efficiency achieves a higher aperture ratio. Thus, the light utilization rate of the display is improved, so as to improve the brightness of the color display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pixel structure of a reflective display, comprising:
    a first sub-pixel, for reflecting a first color light;
    a second sub-pixel, for reflecting a second color light; and
    a third sub-pixel, for reflecting a third color light, wherein the third sub-pixel is arranged side by side with the second sub-pixel, the first sub-pixel is stacked on the third sub-pixel and the second sub-pixel, and the first color light, the second color light, and the third color light have different colors;
    wherein a position of the first sub-pixel is corresponding to positions of the second sub-pixel and the third sub-pixel, and a pixel area of the first sub-pixel is greater than that of the second sub-pixel and is greater than that of the third sub-pixel.

2. The pixel structure of a reflective display according to claim 1, wherein the pixel area of the first sub-pixel is greater than or equal to a sum of the pixel area of the second sub-pixel and the pixel area of the third sub-pixel.

3. The pixel structure of a reflective display according to claim 1, wherein a vertical projection of the first sub-pixel covers entire second sub-pixel and the entire third sub-pixel.

4. The pixel structure of a reflective display according to claim 1, further comprising:
    an absorption layer, disposed on one side of the second sub-pixel opposite to the first sub-pixel and on one side of the third sub-pixel opposite to the first sub-pixel, for absorbing a light passing through the first sub-pixel, the second sub-pixel, and the third sub-pixel.

5. The pixel structure of a reflective display according to claim 1, further comprising:
    an absorption layer, disposed on one side of the first sub-pixel opposite to the second sub-pixel and the third sub-pixel, for absorbing a light passing through the first sub-pixel, the second sub-pixel, and the third sub-pixel.

6. The pixel structure of a reflective display according to claim 1, further comprising:
    a spacer, disposed between the second sub-pixel and the third sub-pixel, for spacing apart the second sub-pixel and the third sub-pixel.

7. The pixel structure of a reflective display according to claim 1, further comprising:
    a first substrate; and
    a second substrate, disposed opposite to the first substrate, wherein the second substrate and the first substrate are respectively disposed on two opposite sides of the first sub-pixel.

8. The pixel structure of a reflective display according to claim 7, further comprising:
    a third substrate, disposed opposite to the second substrate, wherein the third substrate and the second substrate are respectively disposed on two opposite sides of the second sub-pixel, and the third substrate and the second substrate are respectively disposed on two opposite sides of the third sub-pixel;
    wherein the second substrate is disposed between the first sub-pixel and the second sub-pixel and between the first sub-pixel and the third sub-pixel.

9. The pixel structure of a reflective display according to claim 7, further comprising:
    a third substrate; and
    a fourth substrate, disposed opposite to the third substrate, wherein the fourth substrate and the third substrate are respectively disposed on two opposite sides of the second sub-pixel, and the fourth substrate and the third substrate are respectively disposed on two opposite sides of the third sub-pixel;
    wherein the second substrate and the fourth substrate are disposed between the first sub-pixel and the second sub-pixel and between the first sub-pixel and the third sub-pixel.

10. The pixel structure of a reflective display according to claim 1, further comprising:
    a first substrate; and
    a second substrate, disposed opposite to the first substrate, wherein the second substrate and the first substrate are respectively disposed on two opposite sides of the second sub-pixel and the third sub-pixel.

11. The pixel structure of a reflective display according to claim 1, wherein the first sub-pixel is made of a first liquid crystal material, the second sub-pixel is made of a second liquid crystal material, the third sub-pixel is made of a third liquid crystal material, and the first liquid crystal material, the second liquid crystal material, and the third liquid crystal material have different colors.

12. The pixel structure of a reflective display according to claim 1, wherein the first color light is one of a red light, a blue light, and a green light, the second color light is one of a red light, a blue light, and a green light, and the third color light is one of a red light, a blue light, and a green light.

13. A pixel structure of a reflective display, comprising:
- a first liquid crystal layer, comprising:
  - a first sub-pixel, for reflecting a first color light; and
- a second liquid crystal layer, with the first liquid crystal layer stacked on one side of the second liquid crystal layer, comprising:
  - a second sub-pixel, for reflecting a second color light; and
  - a third sub-pixel, arranged side by side with the second sub-pixel, for reflecting a third color light, wherein the first color light, the second color light, and the third color light have different colors;
- wherein a position of the first sub-pixel is corresponding to positions of the second sub-pixel and the third sub-pixel, and a pixel area of the first sub-pixel is greater than that of the second sub-pixel and is greater than that of the third sub-pixel.

14. The pixel structure of a reflective display according to claim 13, wherein the pixel area of the first sub-pixel is greater than or equal to a sum of the pixel area of the second sub-pixel and the pixel area of the third sub-pixel.

15. The pixel structure of a reflective display according to claim 13, wherein a vertical projection of the first sub-pixel completely covers the second sub-pixel and the third sub-pixel.

16. The pixel structure of a reflective display according to claim 13, further comprising:
- an absorption layer, disposed on one side of the second liquid crystal layer opposite to the first liquid crystal layer.

17. The pixel structure of a reflective display according to claim 13, further comprising:
- an absorption layer, disposed on one side of the first liquid crystal layer opposite to the second liquid crystal layer.

18. The pixel structure of a reflective display according to claim 13, wherein the second liquid crystal layer further comprises:
- a spacer, disposed between the second sub-pixel and the third sub-pixel, for spacing apart the second sub-pixel from the third sub-pixel.

19. The pixel structure of a reflective display according to claim 13, further comprising:
- a first substrate; and
- a second substrate, disposed opposite to the first substrate, wherein the second substrate and the first substrate are respectively disposed on two opposite sides of the first liquid crystal layer.

20. The pixel structure of a reflective display according to claim 19, further comprising:
- a third substrate, disposed opposite to the second substrate, wherein the third substrate and the second substrate are respectively disposed on two opposite sides of the second liquid crystal layer;
- wherein the second substrate is disposed between the first liquid crystal layer and the second liquid crystal layer.

21. The pixel structure of a reflective display according to claim 19, further comprising:
- a third substrate; and
- a fourth substrate, disposed opposite to the third substrate, wherein the fourth substrate and the third substrate are respectively disposed on two opposite sides of the second liquid crystal layer;
- wherein the second substrate and the fourth substrate are disposed between the first liquid crystal layer and the second liquid crystal layer.

22. The pixel structure of a reflective display according to claim 13, further comprising:
- a first substrate; and
- a second substrate, disposed opposite to the first substrate, wherein the second substrate and the first substrate are respectively disposed on two opposite sides of the second liquid crystal layer.

23. The pixel structure of a reflective display according to claim 13, wherein the first color light is one of a red light, a blue light, and a green light, the second color light is one of a red light, a blue light, and a green light, and the third color light is one of a red light, a blue light, and a green light.

* * * * *